United States Patent
Skowronski

(10) Patent No.: US 12,530,539 B2
(45) Date of Patent: Jan. 20, 2026

(54) EVENT NORMALIZATION AND ENRICHMENT

(71) Applicant: ServiceNow, Inc., Santa Clara, CA (US)

(72) Inventor: Jason J. Skowronski, Cary, NC (US)

(73) Assignee: ServiceNow, Inc., Santa Clara, CA (US)

( * ) Notice: Subject to any disclaimer, the term of this patent is extended or adjusted under 35 U.S.C. 154(b) by 179 days.

(21) Appl. No.: 18/389,153

(22) Filed: Nov. 13, 2023

(65) Prior Publication Data

US 2025/0156648 A1    May 15, 2025

(51) Int. Cl.
*G06F 40/40*    (2020.01)
*G06F 8/30*    (2018.01)
*G06F 9/54*    (2006.01)
*G06F 16/21*    (2019.01)

(52) U.S. Cl.
CPC ............... *G06F 40/40* (2020.01); *G06F 8/31* (2013.01); *G06F 9/542* (2013.01); *G06F 16/211* (2019.01)

(58) Field of Classification Search
CPC . G06F 40/40; G06F 8/31; G06F 9/542; G06F 16/211
USPC ................................................ 704/8–9, 251
See application file for complete search history.

(56) References Cited

U.S. PATENT DOCUMENTS

2025/0111150 A1*    4/2025    Garapati ................. G06F 40/30

OTHER PUBLICATIONS

Author Unknown, "Introducing ChatGPT", downloaded from <https://openai.com/blog/chatgpt>, published Nov. 30, 2022.
Author Unknown, "Understanding Event Management", downloaded from <https://docs.servicenow.com/bundle/utah-it-operations-management/page/product/event-management/concept/c_EMWhatCanItMonitor.html>, published Feb. 1, 2023.

* cited by examiner

*Primary Examiner* — George C Monikang
(74) *Attorney, Agent, or Firm* — McDonnell Boehnen Hulbert & Berghoff LLP

(57) ABSTRACT

An identification of one or more computer-generated records in a first schema is received. A specification of a second schema different from the first schema is received. A prompt associated with mapping one or more fields and values of the first schema to corresponding one or more fields and values of the second schema is automatically generated for a pre-trained large language model. At least the specification of the second schema and the automatically generated prompt are provided to the pre-trained large language model. A result of the pre-trained large language model is automatically analyzed to determine the mapping between the first schema and the second schema. The determined mapping is used to manage in the second schema, a new computer-generated record received in the first schema.

20 Claims, 11 Drawing Sheets

900

The following is a description of fields (or key value pairs) in the event schema. The names are contained by square brackets. The text following describes whether the field is required or optional, and a description of the field. Some fields also contain a description of the allowed values, in which case those values are required.

[Node]

Optional. A single host name, node name, fully qualified domain name (FQDN), IP address, or MAC address that is associated with the event, such as IBM-ASSET.

[Type]

Optional. The metric type to which the event is related, such as Disk or CPU, which is used to identify an event record from which alerts are created.

Given the following example event, provide a JavaScript function that maps the fields from this event to the event schema provided above. Map each field from the example event to the best matching field in the event schema without duplicating them or leaving any out. Only map the leaf nodes, not entire objects or lists. If there are a list of values pick the best one. If you cannot find a reasonable match for an example event field, add it into the additional information field. Make sure to include all required fields in the event schema. Include comments in the code with your reasoning next to each field mapping. For fields in the event schema that expect values in a specific format, include additional functions as needed to transform the values from the example event to the allowed values of the event schema. If the severity value cannot be determined, use minor as the default value.

FIG. 10

EVENT NORMALIZATION AND ENRICHMENT

BACKGROUND OF THE INVENTION

Event monitoring services offer the ability to monitor and expose specific events of a service, including events associated with third-party services. The monitored events can relate to user activity, application or system crashes, error messages, and/or security breaches, among other events. When an event occurs, typically an alert for the event is issued by the event monitoring service. The alert can include detailed information about the event, such as the category of the event, the time it occurred, and any relevant event data including captured logs. The event alert can also indicate a severity level, such as whether the alert for the event corresponds to a critical, major, or minor alert. Each event monitoring service may utilize different formats or schemas for the event alerts it generates.

BRIEF DESCRIPTION OF THE DRAWINGS

Various embodiments of the invention are disclosed in the following detailed description and the accompanying drawings.

FIG. 9 is a diagram illustrating a portion of an example prompt that is automatically generated to define a target event schema.

FIG. 10 is a diagram illustrating a portion of an example prompt that is automatically generated to convert event data to an event schema.

DETAILED DESCRIPTION

Figure 1:
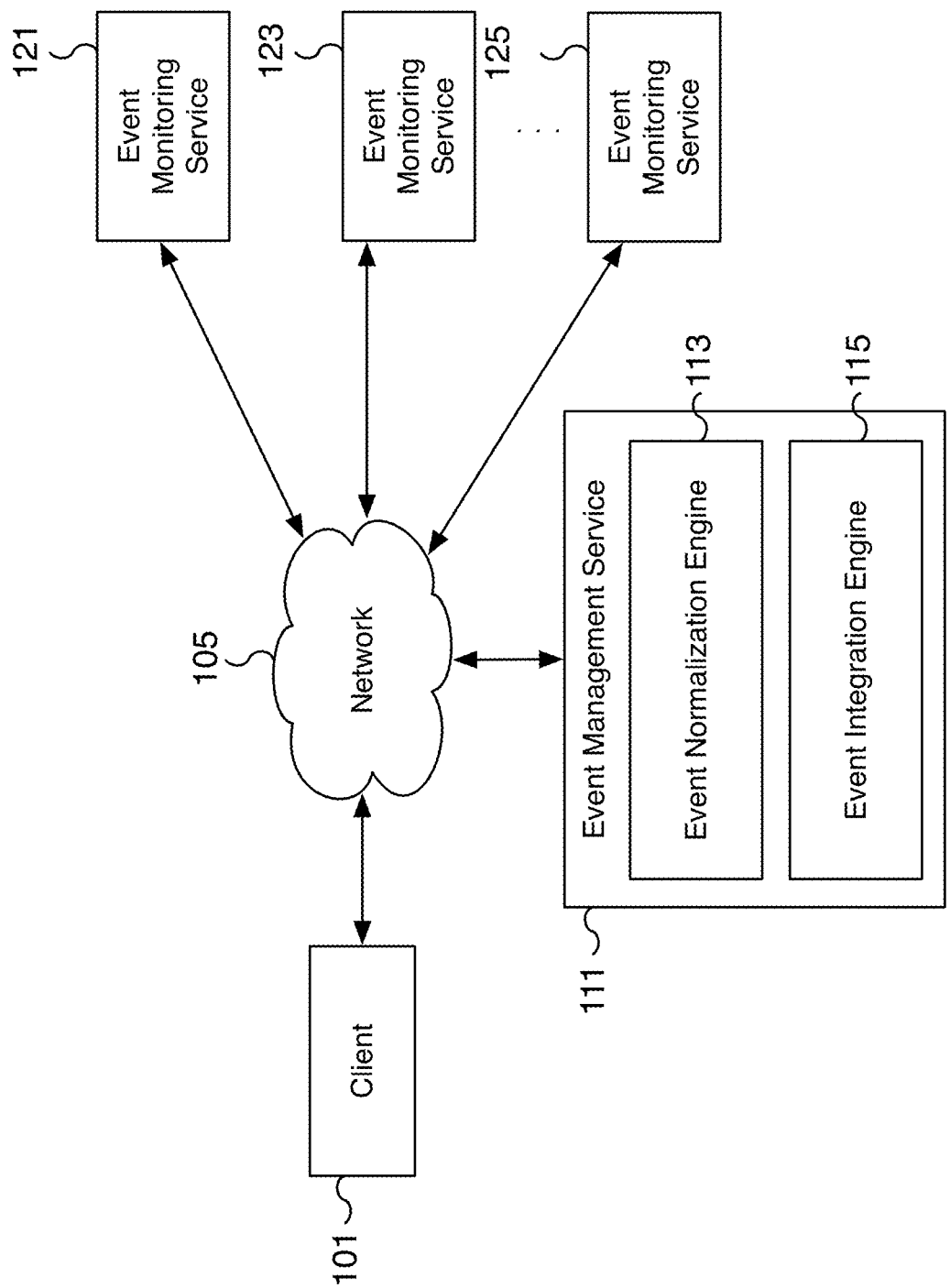
FIG. 1 is a block diagram illustrating an example of a network environment for normalizing and enriching event data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Event normalization and enrichment utilizing generative artificial intelligence (AI) is disclosed. For example, utilizing an event enrichment engine and a trained large language model (LLM), event updates received from different event monitoring services can be normalized into a common format. By applying the disclosed techniques to normalize different events to a common event schema, the different events can be further enriched as part of the conversion as well as part of a subsequent aggregation process. For example, the normalized events can be aggregated by an event management service and presented with additional analysis results on the aggregated data. In some embodiments, additional data is extracted from the aggregated events by analyzing the aggregated results using correlation, data mining, and/or other data analysis techniques.

In various embodiments, different event management systems and their generated event alerts typically utilize different event types and corresponding event schemas. In order to aggregate the different event management systems and their events together, each event management system can require a custom integration process. Using the disclosed techniques, new event types can be automatically integrated by applying a conversion process that utilizes a configured generative artificial intelligence (AI) framework. For example, large language model (LLM) prompts are automatically generated for each new event type to automatically convert events of each new event type to events using a normalized or common event schema. In some embodiments, the LLM prompts can be refined to improve and/or customize the conversion process by accepting feedback from users. For example, user input can be provided to refine the prompts used to generate an event conversion process. Once events are converted to a normalized event schema, they can be aggregated, analyzed, and presented using their new event format. The aggregated analysis results, which may include data mined and correlated analysis results, can be managed and presented for review by an event management service. In certain scenarios, a single entity, such as a business entity, may utilize tens or hundreds of different event management systems to operate their information technology infrastructure, where each event management system requires a custom process to integrate with the event management service. The ability to convert events and in particular alerts for different events sourced from different event management systems into a single normalized event schema managed by an event management service provides significant operational value.

In some embodiments, an identification of one or more computer-generated records is received in a first schema. For example, one or more computer-generated records corresponding to new event alerts are received that utilize a new event type. The event alerts of the new event type can correspond to a new event monitoring service that requires integration with an event management service. In some embodiments, a specification of a second schema different from the first schema is received. For example, a schema corresponding to a universal or common event type is received. The second schema can be a target schema used to normalize the new event type by converting an event utilizing the first schema to an event utilizing the second schema. In particular embodiments, the first schema may be considered a source schema and the second schema a target schema.

In some embodiments, a prompt associated with mapping one or more fields and values of the first schema to corresponding one or more fields and values of the second schema is automatically generated for a pre-trained large language model (LLM). For example, a prompt for the pre-trained LLM is automatically generated that requests a mapping to convert events of the first schema to events of the second schema. The requested mapping will map fields following the first schema to supported fields of the second schema. Similarly, the requested mapping will map values for fields of the first schema to supported values for fields of the second schema. As an example, a requested mapping can convert a severity scale implemented by the first schema to the severity scale utilized by the second schema.

In some embodiments, at least the specification of the second schema and the automatically generated prompt is provided to the pre-trained large language model (LLM). For example, an automatically generated prompt can be provided to the pre-trained LLM along with a description of the second schema. In some embodiments, the description of the second schema is provided as a separate prompt and/or is used to amend the automatically generated prompt. By providing the description of the second schema to the LLM, the LLM is provided with the desired target schema for generating the mapping requested by the automatically generated prompt. In some embodiments, a result of the pre-trained LLM is automatically analyzed to determine the mapping between the first schema and the second schema. For example, the result from the prompt provided to the LLM is analyzed to determine whether the mapping is correct. In some embodiments, the mapping may require additional changes, for example, to correctly convert an instance of an event alert from the first schema to the second schema. Additional information may be required such as one or more additional prompts for the LLM to refine and improve the mapping results returned by the LLM. In various embodiments, the LLM can be provided with additional prompts to correct the mapping between the first schema and the second schema. For example, an additional prompt may provide additional clarity on a valid field or valid values for a field and/or guidelines on how to make a selection when presented with multiple options.

In some embodiments, the determined mapping is used to manage in the second schema, a new computer-generated record received in the first schema. For example, the mapping is used to convert events using the first schema to events using the second schema. In various embodiments, the mapping is used to create computer-generated records such as database records that store converted events using the second schema. In some embodiments, the conversion of events using the first schema is performed by a generated conversion process. For example, once the mapping is finalized, the LLM can be prompted to generate a conversion process such as software programming code and/or a software library or module for automatically converting a record from the first schema to a record that utilizes the second schema. By applying the conversion process, events provided by different event monitoring systems can be integrated together and analyzed via a single event management service. In various embodiments, an identification of one or more computer-generated records in a third, fourth, or additional schema is received. For example, using the techniques disclosed, multiple third-party event data types can be supported by mapping each new source schema to the second and target schema. In various embodiments, computer-generated records of the different schemas are converted to corresponding computer-generated records of the second schema allowing the different types of event data to be managed in a unified manner.

FIG. 1 is a block diagram illustrating an example of a network environment for normalizing and enriching event data. In the example shown, client 101 and event management service 111 are communicatively connected via network 105. Network 105 can be a public or private network. In some embodiments, network 105 is a public network such as the Internet. In various embodiments, event management service 111, which includes event normalization engine 113 and event integration engine 115, is a service that normalizes, aggregates, and enriches events from different event monitoring services, such as event monitoring services 121, 123, and 125. The events and their corresponding event data including event alerts generated by event monitoring services 121, 123, and 125 may each utilize a different event type or event schema. Event management service 111 normalizes the received event data and provides the results including aggregated results to clients such as client 101. For example, client 101 utilizes event management service 111 to manage, review, and process different events and their corresponding alerts generated by event monitoring services 121, 123, and 125.

In some embodiments, client 101 is an example client for accessing services related to event management offered by event management service 111. Client 101 can be a network device such as a desktop computer, a laptop, a mobile device, a tablet, a kiosk, a voice assistant, a wearable device, or another network computing device. As a network device, client 101 can access cloud-based services to manage and review event data generated by different event monitoring services using the common interface of event management service 111. Further, using event management service 111, client 101 can manage and configure different event monitoring services including integrating a new event monitoring service.

In some embodiments, event management service 111 offers cloud-based event management services including the ability to integrate different event monitoring services and their results under a single common event management interface such as an event management dashboard. Moreover, event management service 111 offers the ability to analyze the integrated results, for example, by aggregating, correlating, data mining, and/or performing additional event analysis and enrichment on integrated event data sourced from different event monitoring services. For example, event alerts generated by different event monitoring services can be normalized and then correlated to determine a shared root cause. In various embodiments, event management service 111 includes event normalization engine 113 and event integration engine 115. Event normalization engine 113 can be utilized to normalize different events into a common format or schema using a generative artificial intelligence (AI) framework that includes a trained large language model (LLM). Once event data is normalized, event integration engine 115 can be utilized by clients to access the integrated normalized events and any analysis performed on the normalized events including enriched analysis results. In various embodiments, the normalized events can be enriched at different steps of the integration process including by event normalization engine 113 as part of the normalization process and by event integration engine 115 during the integration/aggregation process.

In some embodiments, event monitoring services 121, 123, and 125 are example monitoring services 121, 123, and 125 used to monitor different events. Additional or fewer event monitoring services can be configured for integration with event management service 111. In various embodiments, event monitoring services 121, 123, and 125 can each utilize different formats or event schemas including event alert schemas for reporting event data such as event alerts. In order to aggregate the event data, the different forms of event data must be normalized into a common format. Example event monitoring services include services for reporting user activity, application or system crashes, error messages, and/or security breaches, among other events. Generated event data, including event alerts, can include detailed information about the event, such as the category of the event, the time it occurred, and any relevant event data including captured logs. The event alert can also indicate a severity level, such as whether the alert for the event corresponds to a critical, major, or minor alert.

Although single instances of some components have been shown to simplify the diagram, additional instances of any of the components shown in FIG. 1 may exist. For example, additional clients other than client 101 may exist. Similarly, additional (or fewer) event monitoring services may exist. For example, as shown by the horizontal ellipses between event monitoring services 123 and 125, additional event monitoring services can exist and be integrated with event management service 111. In some scenarios, a client may choose to integrate hundreds or more different event monitoring services, each with different event schemas. In some embodiments, event management service 111 may be just one cloud service offered by a cloud service provider. For example, other cloud services such as a configuration management database (CMDB) service may be offered along with the event management services offered by event management service 111. In some embodiments, event management service 111 may comprise additional components not shown, such as a storage component for storing normalized event data as well as analysis results from analyzing the normalized data.

Figure 2:
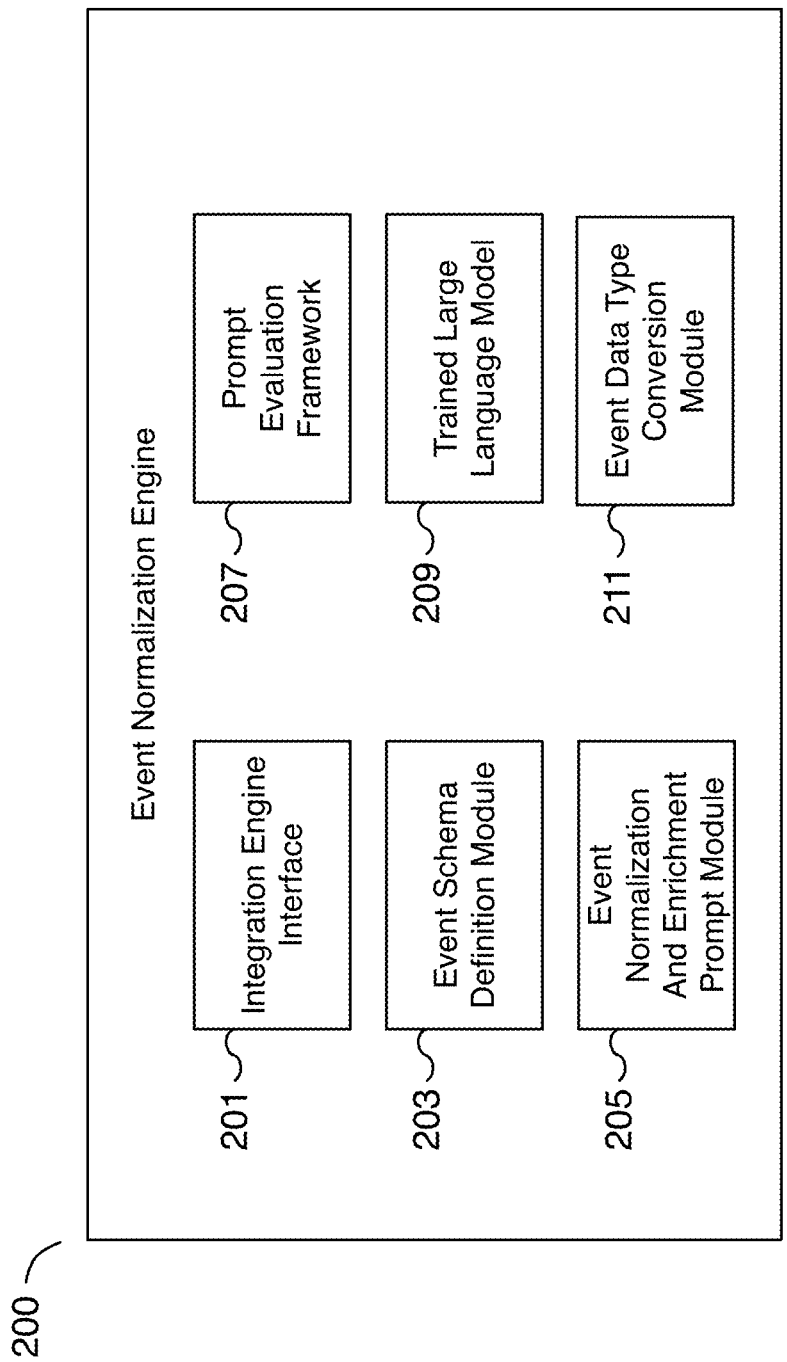
FIG. 2 is a block diagram illustrating an embodiment of an event normalization engine for normalizing and enriching event data.

FIG. 2 is a block diagram illustrating an embodiment of an event normalization engine for normalizing and enriching event data. In the example shown, event normalization engine 200 includes integration engine interface 201, event schema definition module 203, event normalization and enrichment prompt module 205, prompt evaluation framework 207, trained large language model (LLM) 209, and event data type conversion module 211. In various embodiments, the components of event normalization engine 200 are used to normalize event data such as event alerts from different event monitoring systems to a common event schema. As part of the normalization process, the event data is converted to a configured event schema and can be further enriched with additional processing. In some embodiments, event normalization engine 200 is a component of an event management service such as event management service 111 of FIG. 1. In some embodiments, event normalization engine 200 is event normalization engine 113 of FIG. 1.

In some embodiments, integration engine interface 201 is an interface module for communicating with an integration engine of an event management service. For example, using integration engine interface 201, normalized event alerts can be integrated into an event management service for managing and processing normalized event data. In some embodiments, integration engine interface 201 utilizes interfaces such application programming interfaces (APIs) exposed by other components of the event management service. For example, integration engine interface 201 may utilize storage APIs to store normalized event data into a data store for later retrieval, aggregation, and analysis.

In some embodiments, event schema definition module 203 is a processing module that provides definitions of target event schemas for use in event normalization. For example, event schema definition module 203 can generate a prompt for use with trained large language model (LLM) 209 that provides the target schema used for normalization. In various embodiments, one or more different target event schemas can be supported and event schema definition module 203 can be configured with different and/or new target event schemas as needed. In generating a prompt, event schema definition module 203 can include in the generated prompt a description of the valid fields and their corresponding valid (and invalid) values for the target event schema. In some embodiments, the generated prompt is applied to trained LLM 209 using prompt evaluation framework 207 and/or the generated prompt (or target event schema definition) can be combined with the prompt generated by event normalization and enrichment prompt module 205.

In some embodiments, event normalization and enrichment prompt module 205 is a processing module that generates and provides prompts for use with trained large language model (LLM) 209 to perform normalization and enrichment of event data. In various embodiments, the generated prompt performs a mapping from a source schema to the desired target schema as defined and/or configured using event schema definition module 203. For example, event normalization and enrichment prompt module 205 can generate a prompt for use with trained large language model (LLM) 209 that creates a detailed request to map event data, such as event data from a third-party event monitoring service. In some embodiments, the generated prompt is implemented as a series of prompts and can incorporate interactive feedback, such as feedback provided by the system and/or users, for improved accuracy and results. For example, the user can provide preferences such as which selection to prioritize when multiple selections are available.

In various embodiments, event normalization and enrichment prompt module 205 can be used to generate prompts for performing mappings of the event data as well as prompts that generate an automated conversion process that implements the mapping in software programming code and/or a software library. For example, once the mapping provided by trained large language model (LLM) 209 is approved for use (such as it meets an accuracy requirement), a conversion process is generated in response to a subsequent prompt generated by event normalization and enrichment prompt module 205. The generated conversion process can be utilized by event data type conversion module 211 to automatically convert event data in accordance to the approved mapping.

In various embodiments, event normalization and enrichment prompt module 205 can further enrich the event data as part of the normalization process, for example, by annotating the data, validating fields and/or their values, enforcing that event data meet certain requirements such as required fields and their values, assigning default values for certain fields, etc. In some embodiments, the generated prompts are applied to trained large language model (LLM) 209 using prompt evaluation framework 207. In some embodiments, event normalization and enrichment prompt module 205 may utilize and/or rely on additional information such as schema definition information provided by event schema definition module 203.

In some embodiments, prompt evaluation framework 207 is a framework for applying prompts such as prompts generated by event schema definition module 203 and/or event normalization and enrichment prompt module 205 to a large language model. For example, using prompt evaluation framework 207, prompts can be prepared and applied to trained large language model (LLM) 209 and the corresponding results can be received and processed. In some embodiments, the process is an interactive process that includes a series of prompts and corresponding results. In various embodiments, prompt evaluation framework 207 may perform preprocess steps such as preprocessing the input data such as creating generative artificial intelligence (AI) prompts that include the preprocessed input data that can be understood by trained LLM 209. The processing can include tokenization and encoding the provided input data among other actions. Similarly, prompt evaluation framework 207 can postprocess the output of trained LLM 209, for example, to make the results conform with other components such as integration engine interface 201.

In some embodiments, trained large language model (LLM) 209 is a pre-trained large language model. Trained LLM 209 can be trained using significantly large amounts of data and is enabled to process language, including human or natural language, and to provide a result in response to provided prompts. In various embodiments, trained LLM 209 is capable of performing natural language processing (NLP) tasks such as translation, mapping, conversion, and language generation. The language generation functionality can include generating software programming code and/or software libraries that implement a requested mapping from a source schema to a target schema. In various embodiments, trained LLM 209 can be a third-party LLM such as an LLM trained by a third-party for performing both specific and generic artificial intelligence (AI) tasks. In some embodiments, the training performed on trained LLM 209 includes specific mapping and/or conversion training data and trained LLM 209 is at least in part specifically trained to convert between different schemas and/or to generate software programming code and/or libraries. In some embodiments, trained LLM 209 is actually two or more models, each with specific training and applications. For example, a first model can be used to generate a mapping from a source schema to a target schema and a second model can be used to generate a conversion process (such as a software implementation) based on the mapping generated by the first model.

In some embodiments, event data type conversion module 211 is a processing module for automatically converting event data from a source schema to a target schema. Event data type conversion module 211 can be configured with one or more conversion processes generated by the components of event normalization engine 200 such as by prompt evaluation framework 207 and trained large language model (LLM) 209 using prompts provided by event schema definition module 203 and/or event normalization and enrichment prompt module 205. For example, event data type conversion module 211 can execute conversion processes that convert received event data in a source format to a target schema. In some embodiments, event data type conversion module 211 will compile and build executable conversion processes from software programming code generated by trained LLM 209. In various embodiments, event data type conversion module 211 can interface with integration engine interface 201, for example, to provide converted event data for use in an event management service of event normalization engine 200.

Figure 3:
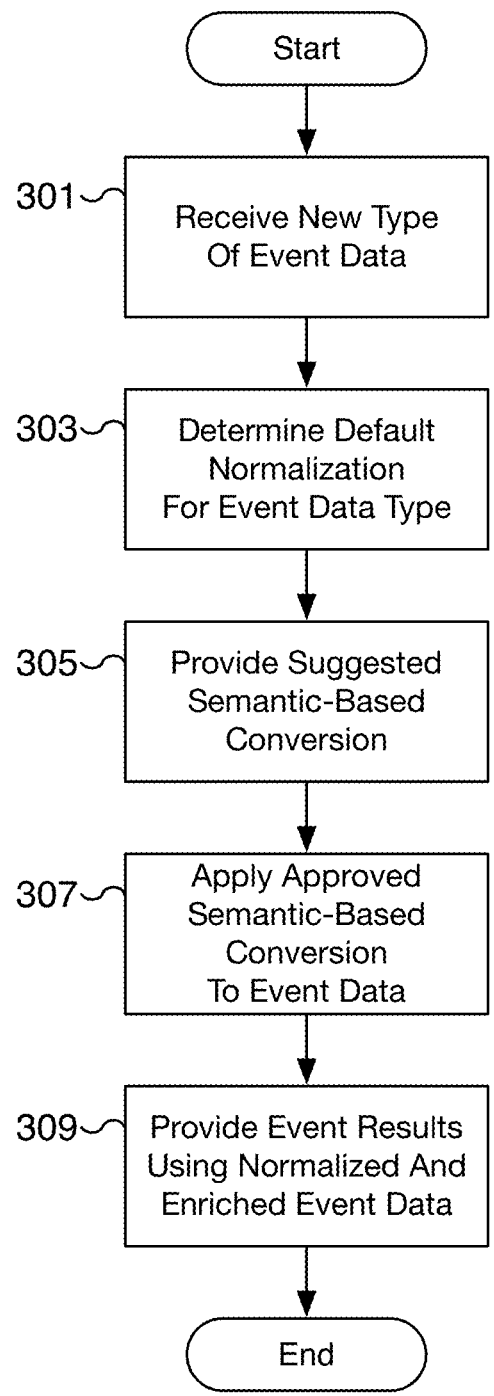
FIG. 3 is a flow chart illustrating an embodiment of a process for normalizing and enriching event data.

FIG. 3 is a flow chart illustrating an embodiment of a process for normalizing and enriching event data. For example, using the process of FIG. 3, an event management service can be configured to receive event data including event data from third-party event monitoring services and convert the received data into a common format useful for analysis and aggregation. In various embodiments, the process of FIG. 3 is used to convert event alerts from a source format to a target format using a target event schema. The conversion process is automated and allows the event management service to easily support hundreds of different event monitoring services and corresponding different event formats. In some embodiments, the process includes an interactive portion that accepts interactive feedback. In some embodiments, the process of FIG. 3 is performed by event management service 111 of FIG. 1 using event normalization engine 113 of FIG. 1 and event integration engine 115 of FIG. 1. In some embodiments, the event normalization engine is event normalization engine 200 of FIG. 2.

At 301, a new type of event data is received. For example, event data is received that corresponds to a new event data type. The received data can be in the format of an event type description, such as an event schema, and/or in the form of example event data including exemplary event data as well as actual event data. In various embodiments, the new event data and/or event data type can be received from the event monitoring service such as via incoming event data and/or another source such as via documentation for the event monitoring service that describes the event data. In some embodiments, the event data is proactively retrieved, for example, by retrieving documentation for the corresponding event monitoring service whose event data is to be integrated.

At 303, a default normalization is determined for the event data type. For example, a default mapping is used to convert the event data type to use a target event schema. The default mapping may utilize rule-based mappings and/or other techniques such as regular expression and/or pattern matching techniques. The default normalization can be presented in a user interface to allow the user to review the results and the corresponding accuracy of the default mapping. In some embodiments, the default normalization is an optional step and all normalization is instead performed at least in part by using the generative artificial intelligence (AI) techniques disclosed herein.

At 305, a suggested semantic-based conversion is provided. For example, using generative artificial intelligence (AI) techniques including automatically generated prompts and a trained large language model (LLM), a semantic-based mapping is suggested for converting the event data type to use a target event schema. In various embodiments, the suggested semantic-based conversion utilizes automatically generated prompts that are fed to a trained LLM. The provided generative AI results can be presented in a user interface to allow the user to review the results and the corresponding accuracy of the semantic-based mapping. In some embodiments, the results can be improved via an interactive process that allows the user to provide feedback for generating subsequent prompts to refine the mapping. Once the semantic-based conversion is approved, a conversion process is generated that converts new event data of the new event data type to use the desired target event schema.

At 307, the approved semantic-based conversion is applied to event data. For example, event data of the new event data type is converted using the approved semantic-based conversion and optionally enriched. In various embodiments, a conversion process such as a conversion software library or software code generated at 305 is applied to automatically convert event data from the new event data type to use the desired target event schema. The conversion process can further include optional enrichment steps such as steps to annotate the converted data, validate fields and/or their values, enforce that the converted event data meets certain requirements such as required fields and their values, and/or assign default values for certain fields, among other actions to enrich the event data. In some embodiments, the event data in the new event data format is received as computer-generated records and, once normalized using the approved semantic-based conversion, is stored using corresponding computer-generated records in the desired event schema.

At 309, event results are provided using the normalized and enriched event data. For example, events and their data are provided in the form of event results to the user via a user interface. The provided event results utilize the normalized and enriched event data and can include aggregated event data and results. For example, the event data, once normalized, can be aggregated and analysis can be performed on the aggregated event data. In some embodiments, the event results provided at 309 include analysis results based on integrated event data, for example, by aggregating, correlating, data mining, and/or performing additional event analysis and enrichment on event data sourced and integrated from different event monitoring services. For example, relationships and root causes based on event data sourced from different event monitoring services can be determined and provided as event results.

Figure 4:
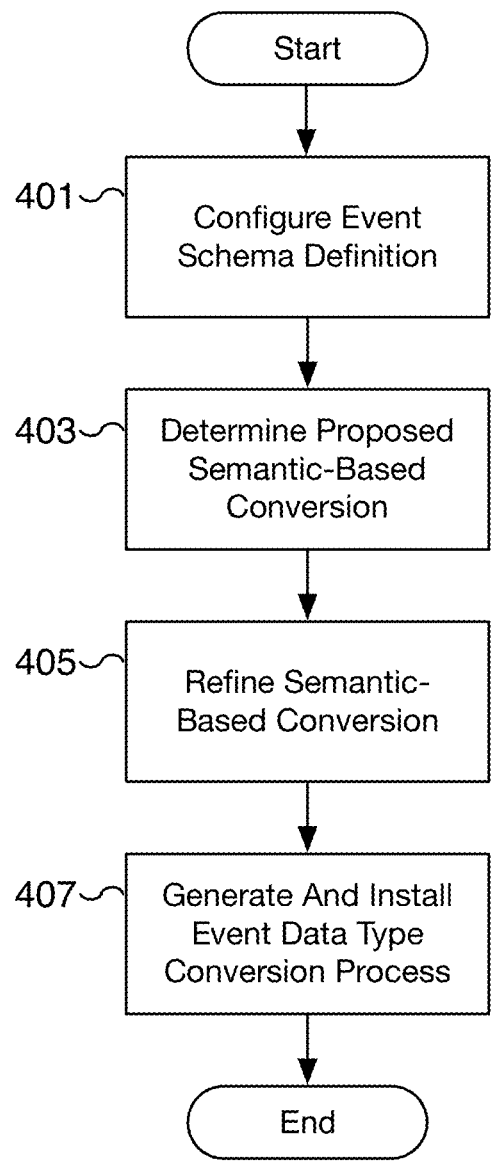
FIG. 4 is a flow chart illustrating an embodiment of a process for normalizing event data using a semantic-based conversion process.

FIG. 4 is a flow chart illustrating an embodiment of a process for normalizing event data using a semantic-based conversion process. For example, using the process of FIG. 4, an event management service using an event normalization engine is configured to convert event data into a desired format or schema by applying an automated semantic-based conversion process. The automated semantic-based conversion process can be automatically generated via one or more automatically generated prompts and a process of applying the prompts to a trained large language model (LLM). In some embodiments, the process is an interactive process that utilizes interactive feedback to generate prompts. In some embodiments, the process of FIG. 4 is performed by an event normalization engine of an event management service at 305 and/or 307 of FIG. 3. In some embodiments, the event management service is event management service 111 of FIG. 1 and the event normalization engine is event normalization engine 113 of FIG. 1 and/or event normalization engine 200 of FIG. 2. In some embodiments, the LLM is trained LLM 209 of FIG. 2.

At 401, an event schema definition is configured. For example, a definition of a target event schema is provided for configuration. The event schema defines the appropriate and valid fields and can include appropriate and valid values for fields. For example, an event schema can define a severity field and the valid values for severity, such as critical, major, minor, warning, OK, and clear. In various embodiments, the provided schema definition defines the structure of event data and the relationship between different elements of event data. In some embodiments, a corresponding database and/or database tables are created (or exist) to implement the event schema. For example, computer-based records can be created for an event alert that utilizes the event schema definition.

At 403, a proposed semantic-based conversion is determined. For example, a proposed mapping that converts a new event data type to utilize the event schema definition configured at 401 is provided. In various embodiments, the mapping converts event data from a source event format to the desired target event format and can be provided via a user interface such as a user interface for an event management service. The mapping is a semantic-based conversion and can be generated using generative artificial intelligence (AI) by providing one or more natural language prompts to a large language model (LLM).

At 405, the semantic-based conversion is refined. For example, the proposed conversion determined at 403 is refined to improve the accuracy of the mapping, if necessary. In some embodiments, the refinement process is an iterative process using automated systems. In some embodiments, the refinement process includes an interactive process that accepts user feedback. For example, a user can provide feedback to refine the mapping using natural language or another user interface and/or form of feedback. During each iteration, the updated and refined conversion results are provided and new feedback is solicited. For example, after viewing the intermediate conversion results, the user can provide preferences such as selection preferences for making a selection when multiple options exist. As another example, the user can provide constraints such as constraining certain fields to a particular list of values. In various embodiments, the semantic-based conversion can be refined via a sequence of prompts for a large language model (LLM).

At 407, an event data type conversion process is generated and installed. For example, once the semantic-based conversion is refined and no additional changes are required for the mapping, a conversion process to implement the mapping is generated and installed. In some embodiments, the conversion process is a functional module specific for each event data type. The functional module can be implemented using software programing code and/or a software library. In some embodiments, the functional module is implemented using a scripting language such as an interpreted scripting language. In various embodiments, the conversion process is generated by providing the mapping refined at 405 to a large language model (LLM). For example, the LLM can generate software programming code that implements the approved conversion in a software conversion layer. In various embodiments, the generated conversion process is installed for execution by an event management service. For example, an event data type conversion module can install the generated conversion process for use in converting the mapped event data type to the desired event schema. In some embodiments, the event data type conversion module is event data type conversion module 211 of FIG. 2.

Figure 5:
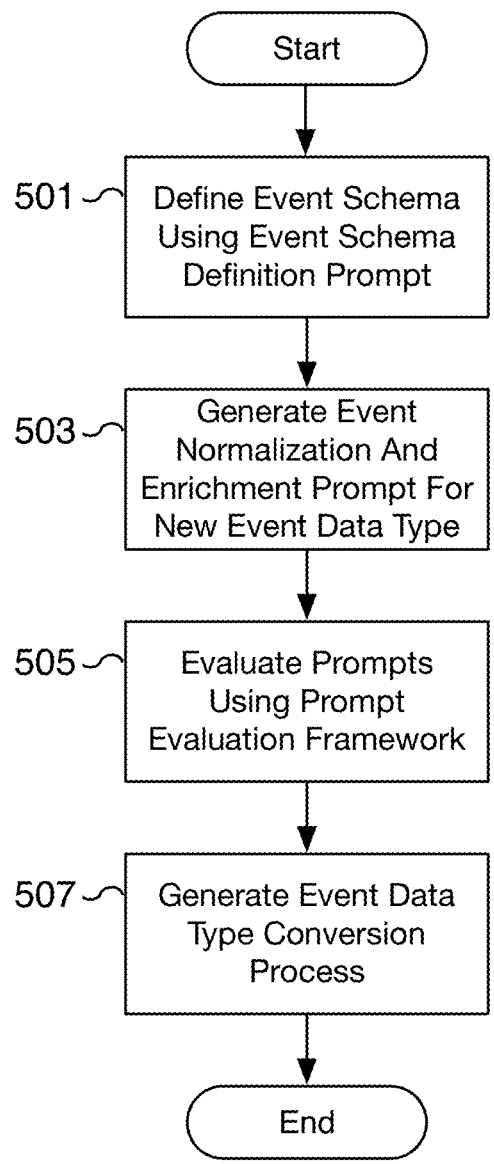
FIG. 5 is a flow chart illustrating an embodiment of a process for normalizing event data using a trained large language model (LLM) with automatically generated prompts.

FIG. 5 is a flow chart illustrating an embodiment of a process for normalizing event data using a trained large language model (LLM) with automatically generated prompts. For example, using the process of FIG. 5, an event normalization engine is configured to generate a conversion process to convert event data of a new event data type to utilize a desired event format. The conversion process is a semantic-based conversion process that applies automatically generated natural language prompts to a trained large language model (LLM). If required, additional prompts can be generated, for example, based on user feedback, to refine the results. In some embodiments, the process of FIG. 5 is performed by an event normalization engine of an event management service at 305 and/or 307 of FIG. 3 and/or at 401, 403, 405, and/or 407 of FIG. 4. In some embodiments, the event management service is event management service 111 of FIG. 1 and the event normalization engine is event normalization engine 113 of FIG. 1 and/or event normalization engine 200 of FIG. 2. In some embodiments, the LLM is trained LLM 209 of FIG. 2.

At 501, an event schema is defined using an event schema definition prompt. For example, a prompt defining an event schema is automatically generated for a trained large language model (LLM). In some embodiments, the prompt, portions of the prompt, or input for generating the prompt is at least partially pre-configured, for example, by an administrator. For example, the target schema can be provided by an administrator and the event schema definition prompt can be automatically generated using the provided target schema. In various embodiments, the generated prompt provides the trained LLM with the desired output format. The generated prompt can include, for example, a description of the event, the event data fields, and values for the event data fields. The prompt may further include a description of properties of the fields and their values. For example, certain fields can be described as optional or required. In some embodiments, the prompt includes a list of allowed values and/or default values for certain fields.

At 503, an event normalization and enrichment prompt is generated for the new event data type. For example, a prompt to perform normalization and enrichment of event data is automatically generated. The prompt can utilize example events and/or a definition of the event data or event data type. For example, a sample of one or more example events or event data can be provided as part of the generated prompt. As another example, a schema for the new event data type can be provided as part of the generated prompt. In some embodiments, the data is retrieved, for example, by analyzing documentation for the new event monitoring service that utilizes the new event data type. In various embodiments, the generated prompt includes preferences for creating the mapping, such as requests that duplicate entries are removed. Other preferences and/or configuration settings can be included in the automatically generated prompt. In some embodiments, the prompt is generated to include enrichment actions, such as directions for annotating the data, validating fields and/or their values, enforcing that converted event data meet certain requirements such as required fields and their values, and/or assigning default values for certain fields, among other enrichment actions.

At 505, prompts are evaluated using a prompt evaluation framework. For example, the event schema definition prompt of step 501 is provided to a prompt evaluation framework to instruct the trained large language model (LLM) of the desired target event schema. The event schema definition prompt provides additional context for the trained LLM to perform the mapping. Similarly, the event normalization and enrichment prompt generated at step 503 is provided to the prompt evaluation framework to instruct the trained large language model (LLM) about the source event. In various embodiments, the prompts are all evaluated within the same context. In response to the prompt evaluation, a mapping is created that maps events of the source event data type to use the desired target event schema. In some embodiments, the mapping is refined using one or more additional follow-up prompts. For example, follow-up prompts can be generated and evaluated based on provided user feedback until the desired mapping is achieved. In some embodiments, the prompt evaluation framework is prompt evaluation framework 207 of FIG. 2 and the trained LLM is trained LLM 209 of FIG. 2.

At 507, an event data type conversion process is generated. For example, once the mapping/conversion performed at 505 matches the required result, an event data type conversion process is generated using a trained large language model (LLM). In some embodiments, the trained LLM is the same LLM used at 505 and/or another LLM can be used, such as an LLM that has undergone additional training for generating conversion processes such as software programming code. In various embodiments, a prompt is generated that uses the event data mapping, the previously generated prompts, and/or the prompt evaluation context of 505 to generate the conversion process for the new event data type. The outputted conversion process can be software programming code in a programming language such as python, JavaScript, C, C++, and/or another programming language. Moreover, the outputted conversion process can include multiple layers of conversion such as multiple functions including nested functions. For example, a mapping function can invoke a severity selection function for selecting the appropriately converted severity value for a converted severity field. The ability to include invoked additional layers of conversion functionality from within the outputted conversion process allows the conversion process to implement very specialized and complex normalization and enrichment tasks including requested preferences and requirements.

In some embodiments, the outputted conversion process is a software program library and/or the outputted programming code is compiled to create a software program library or similar functional module. In various embodiments, the conversion process is implemented in the event management service for evaluation and/or execution. For example, the conversion process is provided as a functional module that can be executed when event data of the matching event data type is encountered. In some embodiments, the conversion process is installed and/or configured for an event data type conversion module such as event data type conversion module 211 of FIG. 2 of an event management service.

Figure 6:
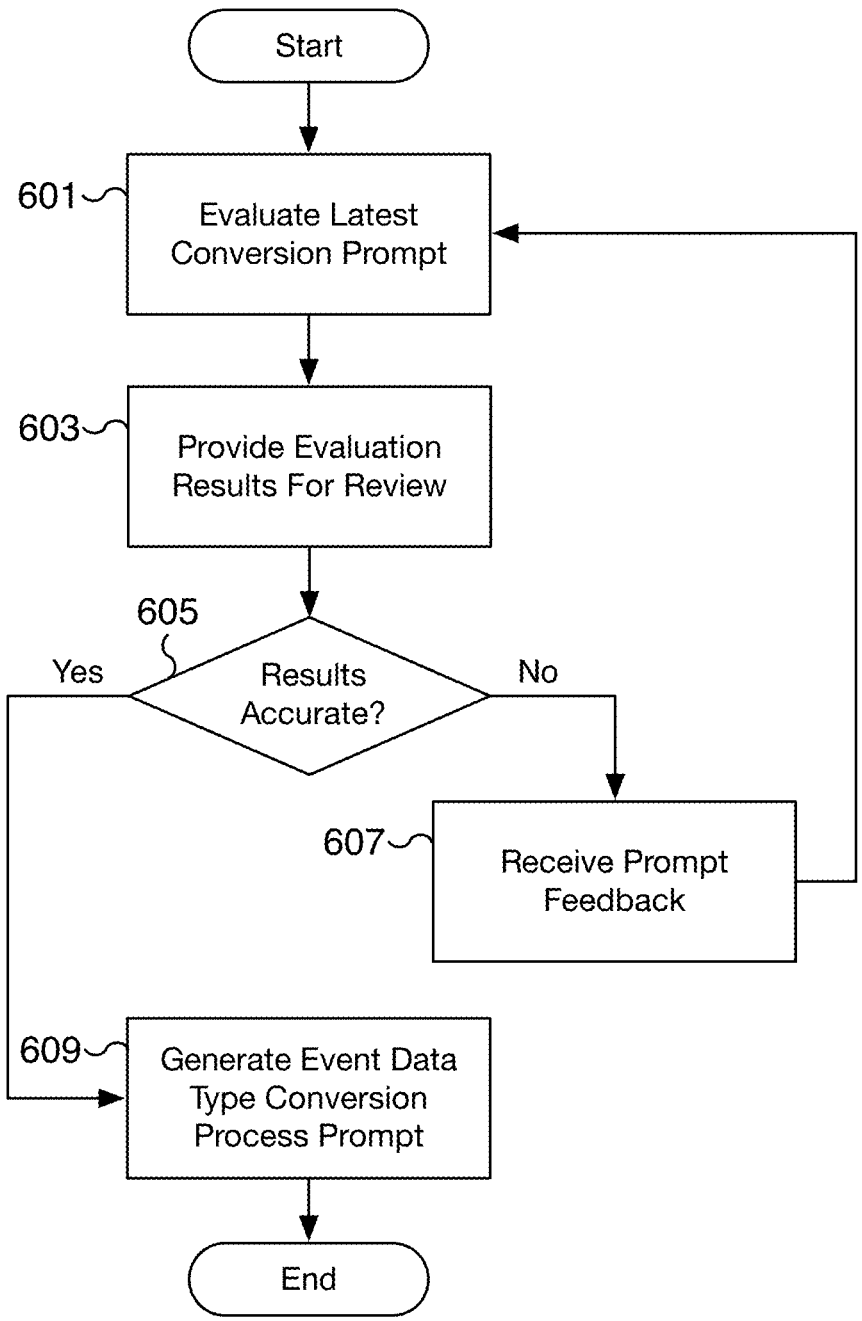
FIG. 6 is a flow chart illustrating an embodiment of a process for refining prompts for normalizing event data using a trained large language model (LLM).

FIG. 6 is a flow chart illustrating an embodiment of a process for refining prompts for normalizing event data using a trained large language model (LLM). For example, using the process of FIG. 6, an event normalization engine is configured using an interactive process to generate a mapping for converting event data to utilize a desired event format or schema. The finalized mapping is then used to generate, using a trained LLM, an automated semantic-based conversion process that can be applied to automatically convert event data into the desired event format. In some embodiments, the process of FIG. 6 is performed by an event normalization engine of an event management service at 305 and/or 307 of FIG. 3, at 401, 403, 405, and/or 407 of FIG. 4, and/or at 501, 503, 505, and/or 507 of FIG. 5. In some embodiments, the event management service is event management service 111 of FIG. 1 and the event normalization engine is event normalization engine 113 of FIG. 1 and/or event normalization engine 200 of FIG. 2. In some embodiments, the LLM is trained LLM 209 of FIG. 2.

At 601, the latest conversion prompt is evaluated. For example, the most recent generated prompt is evaluated by applying the prompt to the trained large language model (LLM). The prompt is typically applied with the existing context, such as a context that includes the target event schema and previous applied prompts for conversion for this event data type, if any. For example, the applied prompt may be the latest in a sequence of related prompts used to refine the conversion process for normalizing (and/or enriching) the event data. In some embodiments, the prompt is applied to the appropriate trained LLM via a prompt evaluation framework such as prompt evaluation framework 207 of FIG. 2.

At 603, evaluation results are provided for review. For example, the evaluation results provided by the trained large language model (LLM) in response to the provided prompt (or prompt sequence) are provided for review such as via a user interface. The results can display the determined mapping from source fields and values to the target schema's fields and corresponding values. In some embodiments, example event data is used to provide evaluation results. For example, an event alert in a source format is converted to the target event schema and the corresponding conversions for fields and values are shown. In some embodiments, the review is performed at least partially by an automated system, such as via another LLM, against one or more rule-based and/or regular expression evaluation checks, against a set of existing event data such as event data stored in a configuration management database (CMDB), and/or via another automated confirmation technique.

At 605, a determination is made whether the conversion is accurate. For example, a determination is made whether the results are sufficiently accurate and/or whether the conversion results have been approved. In the event the conversion is determined to be accurate, processing proceeds to 609 where an automated conversion process based on the conversion results is generated. In the event the conversion is determined to not meet accuracy requirements, such as requiring additional improvements with respect to mapping accuracy, processing proceeds to 607 where feedback can be received to improve the accuracy of the conversion.

At 607, prompt feedback is received. For example, feedback is received to improve the conversion process. The feedback can describe and/or identify additional preferences and/or requirements to apply during the conversion process. The received feedback can be provided via natural language such as via a chat or similar interface configured to accept user provided feedback. For example, a user can require, as expressed using a natural language format, that duplicate elements are to be removed, a default value should be assigned to a particular field, a specific field is a required field, and/or the large language model (LLM) validate the provided event data including data that was not properly converted, among other conversion goals, improvements, preferences, and/or requirements. Other interfaces for receiving feedback are appropriate as well, such as a graphical user interface that allows a user to rank the conversion results including the provided mapping of specific fields and their values. In various embodiments, the received feedback is used to automatically generate a follow-up prompt that can be applied to improve the accuracy of the mapping. The generated prompt can include/incorporate past prompts and/or feedback and/or the prompt can be generated with the intent to apply the prompt in the same/existing context as previously applied prompts for the source event data type.

At 609, an event data type conversion progress prompt is generated. For example, once the mapping has been approved and/or has met accuracy requirements, a prompt is automatically generated that requests a trained large language model (LLM) generate a functional module that can perform the approved mapping on the source event data having the source event data type. The generated prompt may request the conversion progress be generated as programming code such as JavaScript programming code (and/or another programming language). In various embodiments, the goal of the event data type conversion progress prompt is to utilize a trained LLM to automatically generate a conversion process by implementing the conversion process via software programming code. In some embodiments, the software programming code is converted to a software library for execution and/or includes interpretive programming code for evaluation in an interpreter. For example, the generated event data type conversion progress can be created by applying the generated prompt to a trained LLM and then installing the created conversion progress to support converting event data of the source event data type to the target event schema. In some embodiments, the generated conversion process is installed in an event data type conversion module such as event data type conversion module 211 of FIG. 2. In some embodiments, the LLM used for generating the conversion process may be a different LLM than the one used at 601 and/or utilizes an additional LLM that includes the ability to generate programming code. For example, the training used to train the LLM can include training specifically to improve the quality of generated programming code and/or programming solutions.

In some embodiments, the mapping process and the generation of the conversion process is performed together. For example, the process of determining the mapping may utilize a conversion process by generating a functional module that can be applied to event data. In these embodiments, the process combines the mapping and programming code generation steps together, for example, by iteratively improving the generated programming code until the programming code of the conversion process accurately maps and can convert event data of the new event data type to the target event schema. As one example, the prompt evaluated at 601 and the results provided at 603 are based on a mapping that is created, at least in part, via a generated conversion process created from software conversion code generated by a trained large language model (LLM).

Although the disclosed techniques can utilize a trained large language model (LLM) to generate the conversion process, in some embodiments, the event data type conversion progress can be generated without the use of an LLM and/or with other additional techniques and frameworks. For example, once the mapping is determined, the approved mapping from the source event data to target event schema can be provided to an automated conversion tool such as a rule-based conversion tool to generate a functional conversion process.

Figure 7:
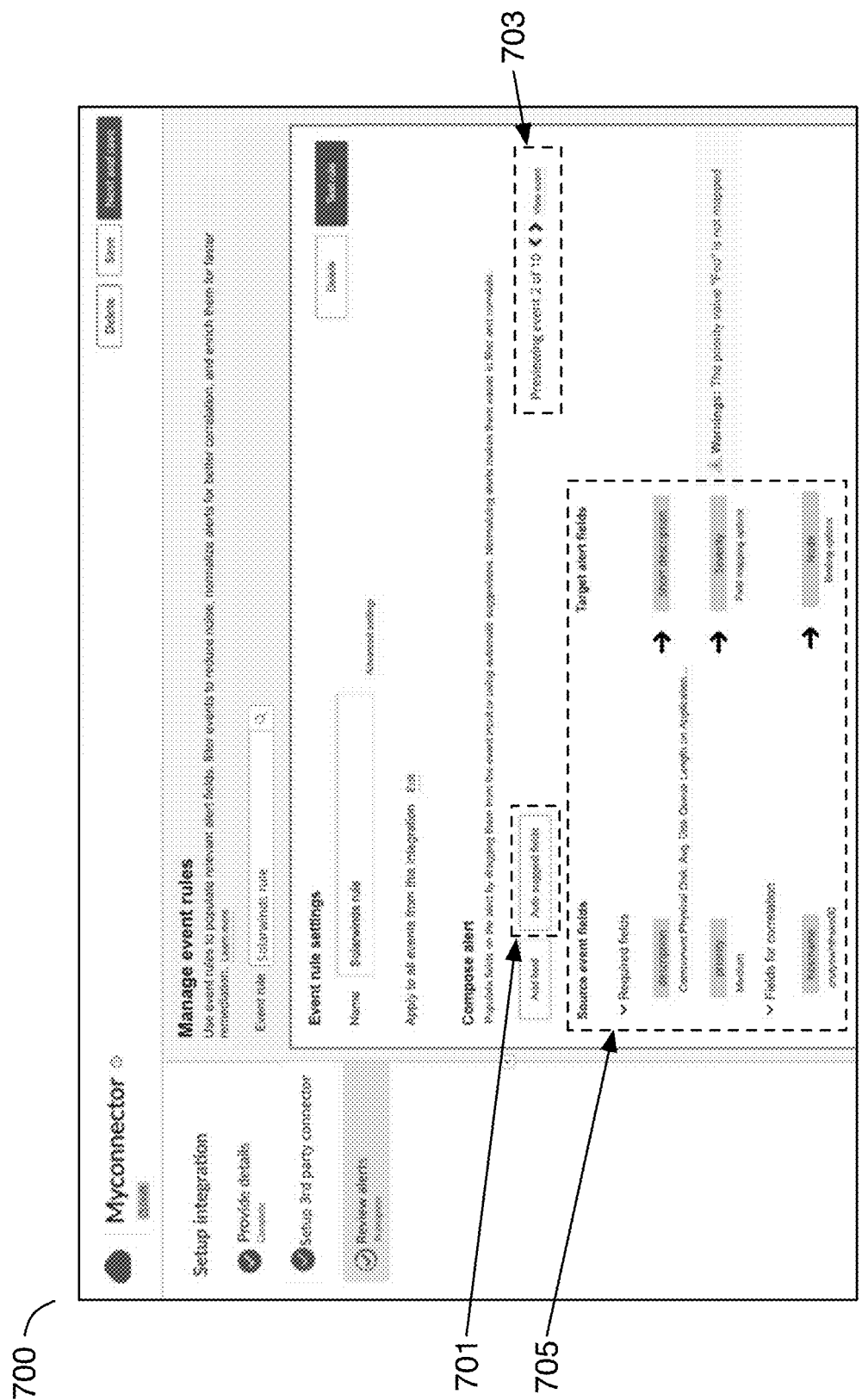
FIG. 7 is a diagram illustrating an embodiment of a user interface for integrating event data into an event management service.

FIG. 7 is a diagram illustrating an embodiment of a user interface for integrating event data into an event management service. In some embodiments, user interface 700 is provided by an event management service for use in configuring the integration of different event monitoring services and their provided event data including event alerts. User interface 700 can be used to review the mapping process of a source event data type used by the event monitoring service to the target schema used by the event management service. In some embodiments, the event management service is event management service 111 of FIG. 1 and the event monitoring service is event monitoring service 121, 123, and/or 125 of FIG. 1. In various embodiments, the event data can be converted to a schema used by the event management service by the processes of FIGS. 3-6 and/or at least in part by an event normalization engine such as event normalization engine 113 of FIG. 1 and/or event normalization engine 200 of FIG. 2.

In the example shown, user interface 700 is used to configure the integration of alerts generated by a third-party event monitoring service. Alerts from the third-party event monitoring service are converted from their source event fields to a target event field. The existing mapping values shown in user interface 700 correspond to default conversions that are not semantic-based and do not utilize the disclosed normalization and enrichment techniques. In the example shown, user interface 700 includes auto suggest fields action button 701 (labeled "Auto suggest fields") that allows the user to launch an auto suggestion feature to convert the event data using the disclosed semantic-based approach. In various embodiments, the auto suggestion feature utilizes the normalization and enrichment techniques disclosed herein. A user interface corresponding to the auto suggestion feature is shown in FIG. 8.

As shown in user interface 700, the event conversion process can receive as input and be applied to multiple events of the same event data type. For example, event selection user interface element 703 of user interface 700 displays information that ten events that utilize the third-party event monitoring service format have been provided to the event management service. The data from event 2 of the ten events is shown in event mapping dialog 705 along with the default mapping. The mapping shown in event mapping dialog 705 is not a semantic-based mapping but rather a default mapping, such as a rules-based mapping. Consequently, the default mapping shown in event mapping dialog 705 includes deficiencies and can be improved using the disclosed normalization and enrichment techniques. For example, the default mapping is unable to map the value "Medium" for the field "priority" to an appropriate "Severity" value in the target event schema. As shown in FIG. 7, the default mapping map is limited in its ability and only maps the fields "description" to "Short description," "priority" to "Severity," and "hostname" to "Node." To improve the conversion results, such as to map the value "Medium" to the appropriate "Severity" value, a user can select auto suggest fields action button 701 to enable semantic-based normalization and enrichment for the event data.

Figure 8:
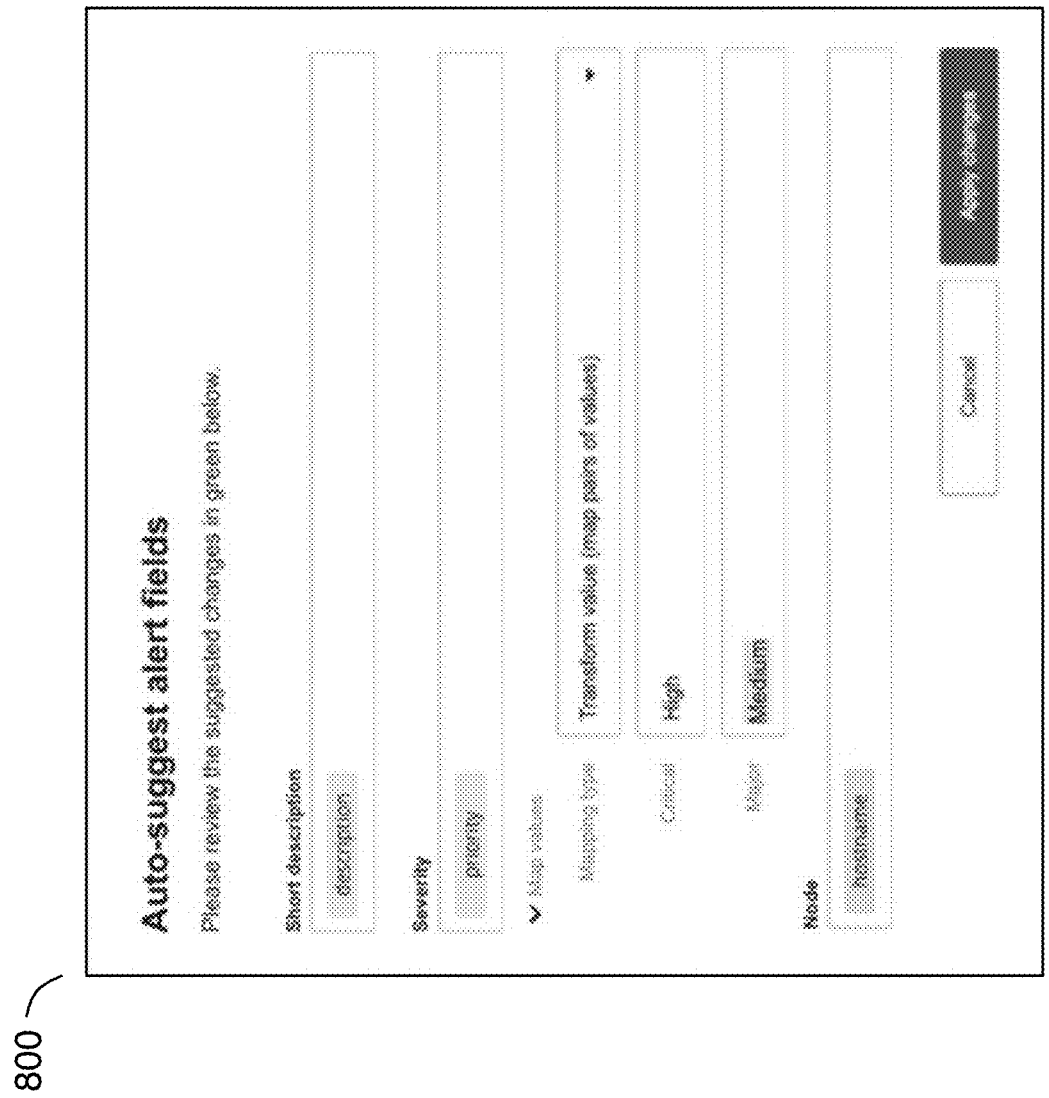
FIG. 8 is a diagram illustrating an embodiment of a user interface for integrating event data using a semantic-based conversion.

FIG. 8 is a diagram illustrating an embodiment of a user interface for integrating event data using a semantic-based conversion. In some embodiments, user interface 800 is provided by an event management service for use in configuring the integration of different event monitoring services and their provided event data including event alerts by applying a semantic-based normalization and enrichment process. User interface 800 can be used to preview the mapping results from converting a source event data type used by the event monitoring service to the target schema used by the event management service. In some embodiments, user interface 800 is further used to refine the conversion results as part of an interactive process capable of responding to user provided feedback. In some embodiments, user interface 800 is launched by selecting auto suggest fields action button 701 of FIG. 7 of user interface 700 of FIG. 7. In some embodiments, the event management service is event management service 111 of FIG. 1 and the event monitoring service is event monitoring service 121, 123, and/or 125 of FIG. 1. In various embodiments, the event data is converted to a schema used by the event management service by the processes of FIGS. 3-6 and/or at least in part by an event normalization engine such as event normalization engine 113 of FIG. 1 and/or event normalization engine 200 of FIG. 2.

In the example shown, user interface 800 is used to display normalization and enrichment results from applying a conversion process to convert an event alert to utilize the event schema of the corresponding event management service. As shown in user interface 800, values for the "Severity" field are appropriately mapped based on context and semantics. For example, not only is the "priority" field from the source event alert mapped to the "Severity" field of the target event schema, the appropriate values of the "priority" field are mapped to appropriate "Severity" values. As shown in user interface 800, the value "High" is mapped to "Critical" and the value "Medium" is mapped to "Major." In various embodiments, the data provided for multiple events (such as the associated ten events shown referenced in FIG. 7) is utilized to convert the event alerts to utilize the target schema. For example, the associated ten events shown referenced in FIG. 7 may include exactly three different values among the ten events for the "priority" field: "Medium," "High," and "Foo." Two of the three "priority" values ("Medium" and "High") are appropriately converted to "Severity" values and are shown in user interface 800. The last "priority" value "Foo" is not converted (as shown included in the event data in FIG. 7 by a warning message) because it does not semantically translate to an appropriate "Severity" value that is supported by the event management service.

In various embodiments, the results shown in user interface 800 are determined using the processes of FIGS. 3-6 and a user interface similar to user interface 800 can be displayed at various steps. For example, a user interface similar to user interface 800 can be used to refine the conversion results and/or to display converted results. In some embodiments, user interface 800 is utilized to refine the conversion process and the user can provide feedback on the conversion process in order to refine the conversion results using additional generated prompts. In some embodiments, user interface 800 displays the converted results after the conversion process has been finalized. In some embodiments, user interface 800 or a similar user interface with semantic-based conversion results is displayed at step 305, 307, and/or 309 of FIG. 3, at step 403 and/or 405 of FIG. 4, at step 505 of FIG. 5, and/or at step 603 of FIG. 6.

FIG. 9 is a diagram illustrating a portion of an example prompt that is automatically generated to define a target event schema. In various embodiments, generative artificial intelligence (AI) prompt 900 is automatically generated based on a configured target event schema. As shown in FIG. 9, generative AI prompt 900 includes a portion of the prompt for a trained large language model (LLM) including a description portion and two of the fields of the event schema, the Node field and the Type field. In various embodiments, generative AI prompt 900 can include many more fields and key value pairs to describe the entirety of the target event schema. In various embodiments, generative AI prompt 900 corresponds to the event schema definition prompt of step 501 of FIG. 5 that is evaluated at step 505 of FIG. 5.

FIG. 10 is a diagram illustrating a portion of an example prompt that is automatically generated to convert event data to an event schema. In various embodiments, generative artificial intelligence (AI) prompt 1000 is automatically generated based on a source event data type and a configured target event schema. As shown in FIG. 10, generative AI prompt 1000 includes a portion of the prompt for a trained large language model (LLM) including a description portion describing the requested normalization and enrichment process. Additional portions and/or subsequent prompts include example event data. In various embodiments, generative AI prompt 1000 is combined with a target event schema prompt such as generative AI prompt 900 of FIG. 9 to perform the normalization and enrichment processes described with respect to FIGS. 3-6. In the example shown, generative AI prompt 1000 can determine, using a corresponding trained LLM, not only the mapping but also a conversion process implementing the mapping using one or more JavaScript functions. In various embodiments, generative AI prompt 1000 corresponds to a prompt of step 503 of FIG. 5 that is evaluated at step 505 of FIG. 5 and/or a prompt of step 601 and/or 609 of FIG. 6.

Figure 11:
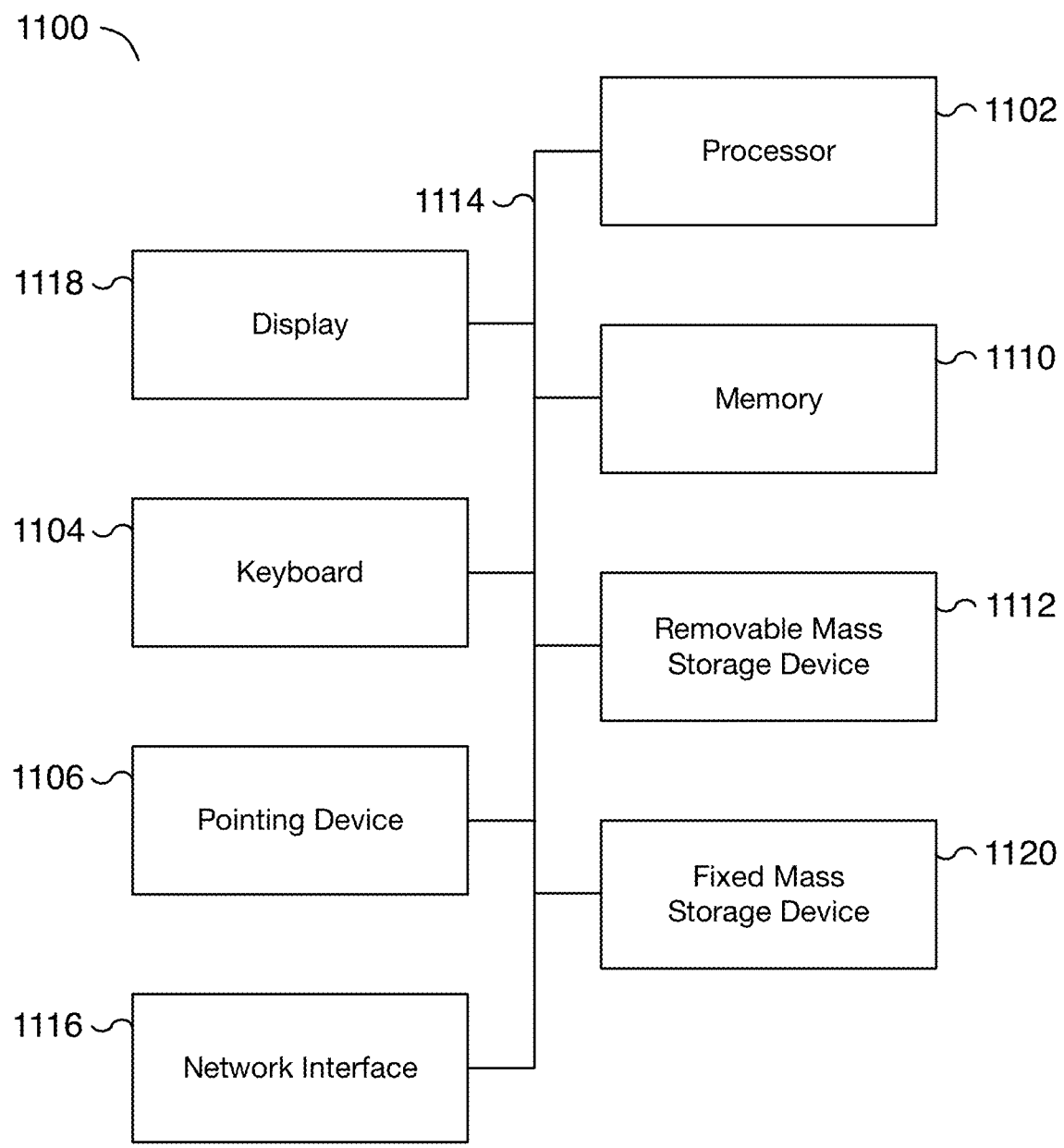
FIG. 11 is a functional diagram illustrating a programmed computer system for normalizing and enriching event data.

FIG. 11 is a functional diagram illustrating a programmed computer system for normalizing and enriching event data. As will be apparent, other computer system architectures and configurations can be utilized for normalizing and enriching event data including those with one or more graphical processing units (GPUs). Examples of computer system 1100 include client 101 of FIG. 1 and one or more computers used to implement event management service 111 of FIG. 1 and/or event monitoring service 121, 123, and/or 125 of FIG. 1. Computer system 1100, which includes various subsystems as described below, includes at least one microprocessor subsystem (also referred to as a processor or a central processing unit (CPU)) 1102. For example, processor 1102 can be implemented by a single-chip processor or by multiple processors. In some embodiments, processor 1102 is a general purpose digital processor that controls the operation of the computer system 1100. Using instructions retrieved from memory 1110, the processor 1102 controls the reception and manipulation of input data, and the output and display of data on output devices (e.g., display 1118). In various embodiments, one or more instances of computer system 1100 can be used to implement at least portions of the processes of FIGS. 3-6, to implement at least portions of the user interfaces of FIGS. 7-8, and to generate at least portions of the corresponding prompts of FIGS. 9-10.

Processor 1102 is coupled bi-directionally with memory 1110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1102. Also as is well known in the art, primary storage typically includes basic operating instructions, program code, data and objects used by the processor 1102 to perform its functions (e.g., programmed instructions). For example, memory 1110 can include any suitable computer-readable storage media, described below, depending on whether, for example, data access needs to be bi-directional or unidirectional. For example, processor 1102 can also directly and very rapidly retrieve and store frequently needed data in a cache memory (not shown).

A removable mass storage device 1112 provides additional data storage capacity for the computer system 1100, and is coupled either bi-directionally (read/write) or unidirectionally (read only) to processor 1102. For example, storage 1112 can also include computer-readable media such as magnetic tape, flash memory, PC-CARDS, portable mass storage devices, holographic storage devices, and other storage devices. A fixed mass storage 1120 can also, for example, provide additional data storage capacity. The most common example of mass storage 1120 is a hard disk drive. Mass storages 1112, 1120 generally store additional programming instructions, data, and the like that typically are not in active use by the processor 1102. It will be appreciated that the information retained within mass storages 1112 and 1120 can be incorporated, if needed, in standard fashion as part of memory 1110 (e.g., RAM) as virtual memory.

In addition to providing processor 1102 access to storage subsystems, bus 1114 can also be used to provide access to other subsystems and devices. As shown, these can include a display monitor 1118, a network interface 1116, a keyboard 1104, and a pointing device 1106, as well as an auxiliary input/output device interface, a sound card, speakers, and other subsystems as needed. For example, the pointing device 1106 can be a mouse, stylus, track ball, or tablet, and is useful for interacting with a graphical user interface.

The network interface 1116 allows processor 1102 to be coupled to another computer, computer network, or telecommunications network using a network connection as shown. For example, through the network interface 1116, the processor 1102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1102 can be used to connect the computer system 1100 to an external network and transfer data according to standard protocols. For example, various process embodiments disclosed herein can be executed on processor 1102, or can be performed across a network such as the Internet, intranet networks, or local area networks, in conjunction with a remote processor that shares a portion of the processing. Additional mass storage devices (not shown) can also be connected to processor 1102 through network interface 1116.

An auxiliary I/O device interface (not shown) can be used in conjunction with computer system 1100. The auxiliary I/O device interface can include general and customized interfaces that allow the processor 1102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 11 is but an example of a computer system suitable for use with the various embodiments disclosed herein. Other computer systems suitable for such use can include additional or fewer subsystems. In addition, bus 1114 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving an identification of one or more computer-generated records in a first schema;
receiving a specification of a second schema different from the first schema;
automatically generating for a pre-trained large language model, a prompt associated with mapping one or more fields and values of the first schema to corresponding one or more fields and values of the second schema;
providing to the pre-trained large language model, at least the specification of the second schema and the automatically generated prompt;
automatically analyzing a result of the pre-trained large language model to determine the mapping between the first schema and the second schema; and
using the determined mapping to manage in the second schema, a new computer-generated record received in the first schema.

2. The method of claim 1, wherein the one or more computer-generated records in the first schema correspond to one or more event alerts.

3. The method of claim 1, further comprising automatically generating a conversion process prompt associated with generating software programming code to perform the mapping between the first schema and the second schema.

4. The method of claim 3, wherein the conversion process prompt is automatically generated for a different large language model trained to generate the software programming code.

5. The method of claim 1, further comprising receiving feedback for improving the result of the pre-trained large language model.

6. The method of claim 5, wherein the received feedback is provided in a natural language format.

7. The method of claim 5, wherein the received feedback includes one or more requirements associated with the mapping between the first schema and the second schema.

8. The method of claim 1, wherein the prompt associated with mapping the one or more fields and values of the first schema to the corresponding one or more fields and values of the second schema includes event data of at least one of the one or more computer-generated records in the first schema.

9. The method of claim 1, further comprising receiving an identification of one or more computer-generated records in a third schema.

10. The method of claim 9, wherein the received identification of the one or more computer-generated records in the first schema is provided by a first event monitoring service and the received identification of the one or more computer-generated records in the third schema is provided by a second event monitoring service different from the first event monitoring service.

11. A system comprising:
one or more processors; and
a memory coupled to the one or more processors, wherein the memory is configured to provide the one or more processors with instructions which when executed cause the one or more processors to:
receive an identification of one or more computer-generated records in a first schema;
receive a specification of a second schema different from the first schema;
automatically generate for a pre-trained large language model, a prompt associated with mapping one or more fields and values of the first schema to corresponding one or more fields and values of the second schema;
provide to the pre-trained large language model, at least the specification of the second schema and the automatically generated prompt;
automatically analyze a result of the pre-trained large language model to determine the mapping between the first schema and the second schema; and
using the determined mapping, manage in the second schema, a new computer-generated record received in the first schema.

12. The system of claim 11, wherein the one or more computer-generated records in the first schema correspond to one or more event alerts.

13. The system of claim 11, wherein the memory is further configured to provide the one or more processors with the instructions which when executed cause the one or more processors to automatically generate a conversion process prompt associated with generating software programming code to perform the mapping between the first schema and the second schema.

14. The system of claim 13, wherein the conversion process prompt is automatically generated for a different large language model trained to generate the software programming code.

15. The system of claim 11, wherein the memory is further configured to provide the one or more processors with the instructions which when executed cause the one or more processors to receive feedback for improving the result of the pre-trained large language model.

16. The system of claim 15, wherein the received feedback is provided in a natural language format.

17. The system of claim 15, wherein the received feedback includes one or more requirements associated with the mapping between the first schema and the second schema.

18. The system of claim 11, wherein the memory is further configured to provide the one or more processors with the instructions which when executed cause the one or more processors to receive an identification of one or more computer-generated records in a third schema.

19. The system of claim 18, wherein the received identification of the one or more computer-generated records in the first schema is provided by a first event monitoring service and the received identification of the one or more computer-generated records in the third schema is provided by a second event monitoring service different from the first event monitoring service.

20. A computer program product, the computer program product being embodied in a non-transitory computer readable storage medium and comprising computer instructions for:

receiving an identification of one or more computer-generated records in a first schema;

receiving a specification of a second schema different from the first schema;

automatically generating for a pre-trained large language model, a prompt associated with mapping one or more fields and values of the first schema to corresponding one or more fields and values of the second schema;

providing to the pre-trained large language model, at least the specification of the second schema and the automatically generated prompt;

automatically analyzing a result of the pre-trained large language model to determine the mapping between the first schema and the second schema; and using the determined mapping to manage in the second schema, a new computer-generated record received in the first schema.

* * * * *